United States Patent
Böke

(10) Patent No.: US 6,682,316 B1
(45) Date of Patent: Jan. 27, 2004

(54) DISPENSING SYSTEM FOR PETROL-PUMPS, INCLUDING A BYPASS AND PRINCIPLE VALVE

(75) Inventor: Harald Böke, Kalletal-Kalldorf (DE)

(73) Assignee: Burkert Werke GmbH & Co. (DE)

( * ) Notice: Subject to any disclaimer, the term of this patent is extended or adjusted under 35 U.S.C. 154(b) by 0 days.

(21) Appl. No.: 10/031,444

(22) PCT Filed: Jul. 24, 2000

(86) PCT No.: PCT/EP00/07081

§ 371 (c)(1),
(2), (4) Date: Jul. 1, 2002

(87) PCT Pub. No.: WO01/07356

PCT Pub. Date: Feb. 1, 2001

(30) Foreign Application Priority Data

Jul. 22, 1999 (DE) .......................... 299 12 814

(51) Int. Cl.⁷ ............................. F04B 49/035
(52) U.S. Cl. ............ 417/307; 417/302; 417/304; 417/505; 417/279; 251/30.04; 251/34
(58) Field of Search ............... 417/307, 308, 417/302, 304, 505, 279; 251/30.03, 30.04, 34

(56) References Cited

U.S. PATENT DOCUMENTS

| | | | | |
|---|---|---|---|---|
| 3,797,526 A | * | 3/1974 | Champeon | 137/630.14 |
| 5,048,790 A | * | 9/1991 | Wells | 251/30.04 |
| 5,551,664 A | | 9/1996 | Boke | |
| 5,762,087 A | * | 6/1998 | Khadim | 137/1 |
| 5,984,650 A | * | 11/1999 | Okubo et al. | 417/470 |
| 6,149,124 A | * | 11/2000 | Yang | 251/30.03 |
| 6,328,275 B1 | * | 12/2001 | Yang et al. | 251/30.03 |

FOREIGN PATENT DOCUMENTS

EP    0 872 674    10/1998

* cited by examiner

Primary Examiner—Justine R. Yu
Assistant Examiner—Emmanuel Sayoc
(74) Attorney, Agent, or Firm—Nixon Peabody LLP; Stuart J. Friedman

(57) ABSTRACT

A dispensing system for petrol pumps, comprising a pump, a dispensing valve in a petrol pump nozzle and an electrically controllable solenoid valve (10), characterized in that the solenoid valve (10) includes a directly acting principal valve (18) and a bypass valve (30) arranged so as to bypass the principal valve (18), and a solenoid drive (34) by which in case of a differential pressure present above the sealing seat (24) of the principal valve (18) at first only the bypass valve (30) is able to be switched to the open position, and only after a pressure compensation has occurred at the sealing seat (24) of the principal valve (18) by the opening of the bypass valve (30) is the principal valve (18) also able to be switched to the open position.

7 Claims, 1 Drawing Sheet

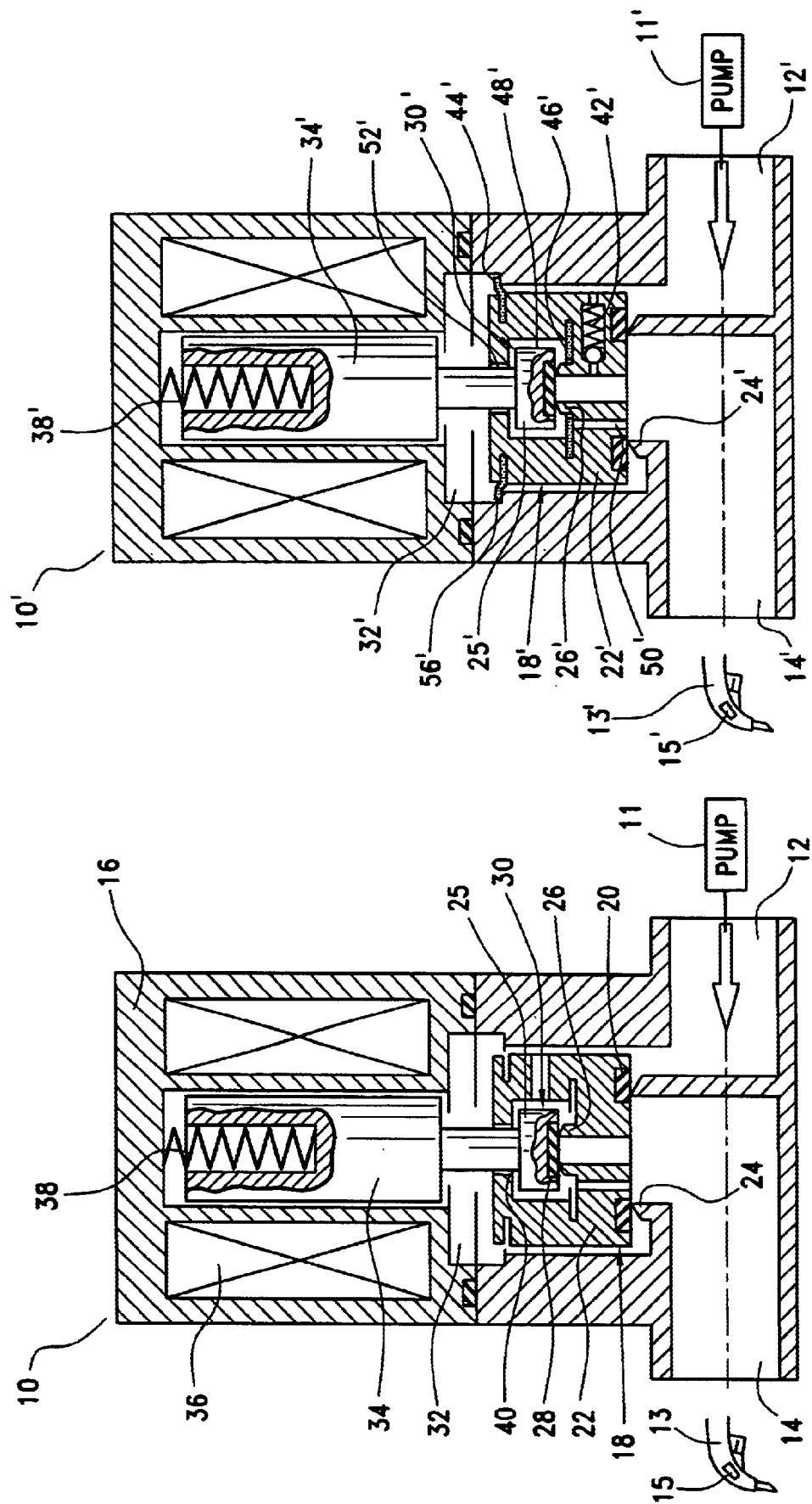

DISPENSING SYSTEM FOR PETROL-PUMPS, INCLUDING A BYPASS AND PRINCIPLE VALVE

The invention relates to a dispensing system for petrol pumps, comprising a pump, a dispensing valve in a petrol pump nozzle and an electrically controllable solenoid valve.

Dispensing systems for petrol pumps allowing a preselection of a desired fuel amount are controlled in such a way that a principal valve is closed shortly before the selected value is reached and the remaining fuel amount is pumped through a bypass valve which is then also closed when the selected value has been reached. In dispensing systems as known from the prior art, the two valves are operated separately, for example via two electrically controlled magnets.

The invention, provides a dispensing system for petrol pumps, in which the principal valve and the bypass valve are controlled in a simple and cost-effective manner.

In a dispensing system for petrol pumps, comprising a pump a dispensing valve in a petrol pump nozzle and an electrically controllable solenoid valve, this is achieved in that the solenoid valve includes a directly acting principal valve and a bypass valve arranged so as to bypass the principal valve, and a solenoid drive by which in case of a differential pressure present above the sealing seat of the principal valve at first only the bypass valve is able to be switched to the open position, and only after a pressure compensation has occurred at the sealing seat of the principal valve by the opening of the bypass valve is the principal valve also able to be switched to the open position.

The principal valve and a bypass valve arranged so as to bypass the former are opened via one single electrically controlled solenoid drive. Whether both the principal valve and the bypass valve are opened or whether only the bypass valve is opened is dependent on whether a differential pressure is present above the sealing seat of the principal valve. This provides a simple and cost-effective solution allowing to open only one valve or both valves as required.

In accordance with an advantageous embodiment provision is made that, with the pump active and the dispensing valve opened, the principal valve is closed by momentarily switching the solenoid drive off, and that upon switching the solenoid drive back on it will remain closed due to the differential pressure prevailing above its sealing seat.

In petrol pumps allowing a preselection of a desired fuel amount, this results in that both valves are momentarily closed shortly before the preselected value is reached and the remaining fuel amount is pumped through the bypass valve. The reduced flow via the bypass valve permits the fuel to be metered more exactly.

Further features and advantageous further developments of the invention are apparent from the dependent claims.

The invention will now be described with reference to several embodiments which are illustrated in the accompanying drawings in which:

FIG. 1 shows a sectional view of a solenoid valve of a dispensing system for petrol pumps according to the invention in the closed condition in accordance with a first embodiment;

FIG. 2 shows a sectional view of a solenoid valve of a dispensing system for petrol pumps according to the invention in the closed condition in accordance with a second embodiment.

The solenoid valve 10 illustrated in FIG. 1 is connected with a pump 11 via an inlet duct 12 and, via an outlet duct 14, with a petrol pump nozzle 13 including a dispensing valve 15. The solenoid valve 10 has in a valve body 16 a principal valve 18 having an annular seal 20 in a sealing body 22. In the closed condition the annular seal 20 rests on a sealing seat 24 of the principal valve 18. A sealing body 25 having a sealing seat 26 and a seal 28 of a bypass valve 30 is formed in the sealing body 22 of the principal valve 18. A cavity 32 is formed in the valve body 16 above the sealing body 22 of the principal valve 18 as viewed in FIG. 1, the cavity 32 communicating with the inlet duct 12. The bypass valve 30 is arranged so as to bypass the principal valve 18. The two valves 18, 30 are adapted to be controlled by a solenoid drive 34 which is electrically switched on and off via a cylindrical coil 36. In the de-energized state, the solenoid valve 10 is automatically closed by a compression spring 38.

When the petrol pump nozzle (not shown here) is removed from the petrol pump, the solenoid valve 10 is electrically controlled via the cylindrical coil 36. In this process, the pump may be switched simultaneously with the solenoid valve 10 or may be switched in a delayed manner.

If the pressure above the sealing seat 24 of the principal valve 18 on the side facing the pump equals the pressure on the side facing the petrol pump nozzle, the principal valve 18 and the bypass valve 30 will be opened. In this process, the solenoid drive 34 directly engages the sealing body 25 of the bypass valve 30 so that the sealing body 25 is moved upwards as related to FIG. 1. The sealing body 22 of the principal valve 18 is not initially moved. Only when the sealing body 25 of the bypass valve 30 engages the sealing body 22 of the principal valve 18 via a stop face 40 will the sealing body 22 also be moved upwards as related to FIG. 1. This will open the principal valve 18 as well, and fuel is pumped by the pump from the inlet duct 12 via the principal valve 18, and smaller amounts of fuel are pumped via the bypass valve 30 to the outlet duct 14 and, hence, to the petrol pump nozzle.

If the pressure above the sealing seat 24 of the principal valve 18 on the side facing the pump is greater than the pressure on the side facing the petrol pump nozzle, only the bypass valve 30 can be opened: since the cavity 32 above the sealing body 22 of the principal valve 18 is in communication with the inlet duct 12, the pressure acting on the sealing body 22 as viewed in FIG. 1 is greater from the top than from below. The solenoid drive 34 is then not sufficient to move the principal valve 18 upwards against the force acting on the sealing body 22 of the principal valve 18 by the difference in pressure. The sealing body 25 of the bypass valve 30 is moved by the solenoid drive 34 as far as to the stop face 40 of the sealing body 22. Thereby the bypass valve 30 is opened and a pressure compensation can occur. When there is no longer a pressure difference above the sealing seat 24 of the principal valve 18, the solenoid drive 34 can move the sealing body 22 of the principal valve 18 as well, so that the principal valve 18 is opened. When the filling process is completed, the cylindrical coil 36 and the pump are de-energized and both valves 18, 30 are closed by the compression spring 38.

In dispensing pumps allowing a preselection of the desired fuel amount, the cylindrical coil 36 is momentarily de-energized shortly before the selected value is reached. This will close both valves 18, 30 via the compression spring 38. Since both the pump is switched on and also the dispensing valve of the petrol pump nozzle is opened, a differential pressure will build up above the principal valve seat 24. Therefore, when the solenoid valve 10 is driven again only the bypass valve 30 is opened. The remaining fuel amount is pumped via the bypass valve 30. When the desired value has been reached, the solenoid drive 34 is switched off and both valves 18, 30 are closed via the compression spring 38.

This configuration has the advantage that one single solenoid drive 34, which requires only one electric control, is sufficient for opening the two valves 18, 30. This provides a cost-effective and simple dispensing system for petrol stations.

Compared with the embodiment shown in FIG. 1, the embodiment of a solenoid valve 10' shown in FIG. 2 additionally comprises a check valve 42' which acts as a measuring limit valve and is integrated in the sealing body 22' of the principal valve 18'. The check valve 42' is arranged so as to bypass the principal valve 18'. In addition to this, a diaphragm 44' is arranged in a connection between the cavity 32' and the inlet duct 12' and is fastened to the sealing body 22'. With reference to FIG. 2, a further diaphragm 46' is located below the sealing body 25' of the bypass valve in a connection 50' between the outlet duct 14' and a cavity 48'. Arranged in the cavity 48' is the sealing body 25' of the bypass valve. The cavity 32' and the cavity 48' are connected with each other via a cylindrical recess 52' of the sealing body 22' of the principal valve 18'.

In the case of a rapid increase in pressure in the outlet duct 14' with the dispensing valve closed and the solenoid valve closed, for example owing to an expansion of the fuel due to strong insolation or due to a car running over the petrol pump hose, fuel is allowed to get from the outlet duct 14' into the inlet duct 12' via the check valve 42' so as to prevent damage to the dispensing valve or the solenoid valve 10'. The high pressure in the outlet duct 14' acts to shift a ball of the check valve 42' to the right as viewed in FIG. 2, counter to the spring force exerted on the ball, so that the check valve 42' is opened for so long until the pressure in the outlet duct 14' again decreases below a value predefined by the spring. This ensures that the pressure in the outlet duct 14' does not exceed a certain value. Moreover, with the aid of the diaphragm 44' and the diaphragm 46' the principal valve 18' and the bypass valve 30' are prevented from being opened by the high pressure prevailing in the outlet duct 14': upon a pressure increase in the outlet duct 14', fuel flows from the inlet duct 12' via the connection 50' past the upwardly folded diaphragm 46' and into the cavity 48', from where it flows through the cylindrical recess 52' and further into the cavity 32'. The pressure inside the cavities 32', 48' which acts on the diaphragm 44' from the side of the cavity 32', is now greater than the pressure in the inlet duct 12' which acts on the diaphragm 44' from the other side. In this way the diaphragm 44' is pressed against a housing-fixed annular surface 56' so that it is not possible for the fuel to flow back from the cavity 32' into the inlet duct 12'. In the same way the diaphragm 46' makes sure that no fuel can return from the cavity 48' to get into the outlet duct 14'. Since the pressure in the cavities 32', 48' is now greater than that in the outlet duct 14', the principal valve 18' and the bypass valve 30' remain closed.

Accordingly, in this embodiment there is additionally provided a device which is integrated in the solenoid valve and which in case of a pressure rise in the outlet duct 14' ensures that, with the dispensing valve closed and the solenoid valve 10' closed, the pressure in the outlet duct 14' does not exceed a predetermined value and the two valves nonetheless remain closed.

If there is a pressure compensation between the inlet duct 12' and the outlet duct 14', the solenoid drive 34' can open both valves 18', 30'.

If, on the other hand, the pressure prevailing in the inlet duct 12' is higher than that in the outlet duct 14', the valve is opened in the following way: at the beginning the dispensing valve remains closed and fuel flows into the cavity 32' via the diaphragm 44' pressed upwards. The solenoid valve 10' is driven, so that the sealing body 25' is slightly lifted off the associated sealing seat. Due to the higher pressure on the upper side of the sealing body 22', which tends to hold the latter on its sealing seat, the solenoid drive is unable to lift the sealing body 22' off the sealing seat 24'. For this to become possible, a pressure compensation must first occur between the outlet duct 14' and the inlet duct 12', which may be effected by fuel flowing in via the opened bypass valve 30'. Only when this pressure compensation has occurred will the force of the solenoid drive 34' be great enough to lift the sealing body 22' clear of the sealing seat 24'. During the lifting process the position of the diaphragm 44' is undefined, that is, fuel may flow into or out of the cavity 32'.

What is claimed is:

1. A dispensing system for petrol pumps, comprising a pump, a dispensing valve in a petrol pump nozzle and an electrically controllable solenoid valve (10), wherein the solenoid valve (10) includes a directly acting principal valve (18) having a sealing body (22) and a bypass valve (30) arranged so as to bypass the principal valve (18), a check valve (42') acting as a measuring limit valve integrated in the sealing body (22) of the principal valve (18), and a solenoid drive (34) by which in case of a differential pressure present above a sealing seat (24) of the principal valve (18) at first only the bypass valve (30) is able to be switched to the open position, and only after a pressure compensation has occurred at the sealing seat (24) of the principal valve (18) by the opening of the bypass valve (30) is the principal valve (18) also able to be switched to the open position.

2. The dispensing system according to claim 1, wherein the solenoid drive (34) engages a sealing body (25) of the bypass valve (30) for moving said sealing body (25) of the bypass valve (30) relative to the sealing body (22) of said principal valve (18) until said sealing body (25) of the bypass valve (30) engages a stop face (40) formed in the sealing body (22) of the principal valve (18).

3. The dispensing system according to claim 2, wherein the sealing seat (26) of the bypass valve (30) is formed in the sealing body (22) of the principal valve (18).

4. The dispensing system according to claim 1, wherein with the pump active and the dispensing valve opened, the principal valve (18) is closed by momentarily switching the solenoid drive (34) off, and that upon switching the solenoid drive (34) back on it will remain closed due to the differential pressure prevailing above its sealing seat (24).

5. The dispensing system according to claim 1, wherein both valves (18, 30) are opened upon a pressure compensation at the sealing seat (24) of the principal valve (18) by switching the solenoid drive (34) on.

6. A dispensing system for petrol pumps, comprising:
   a pump,
   a dispensing valve in a petrol pump nozzle,
   an electrically controllable solenoid valve being connected to said pump via an inlet duct and being connected to said petrol pump nozzle via an outlet duct,
   said solenoid valve having a valve body housing a directly acting principal valve and a bypass valve arranged so as to bypass said principal valve,
   said principal valve having a sealing body for cooperation with a sealing seat formed in said valve body and a first cavity being formed in said valve body above said sealing body of said principal valve, said first cavity communicating with said inlet duct, and a first diaphragm being arranged in a connection between said first cavity and said inlet duct, said first diaphragm allowing petrol flow from said inlet duct to said first cavity, and blocking petrol flow from said first cavity to said inlet duct when pressure in said cavity exceeds pressure in said inlet duct.

7. The system of claim 6, wherein said bypass valve has a sealing body which is arranged in a second cavity formed in said sealing body of said principal valve, said first and second cavities being connected with each other and said second cavity being connected with said inlet duct, and a second diaphragm being arranged in a connection between said second cavity and said inlet duct.

* * * * *